United States Patent
Yamakami et al.

(10) Patent No.: US 9,212,012 B2
(45) Date of Patent: Dec. 15, 2015

(54) TAPERED ROLLER BEARING FABRICATING SYSTEM AND TAPERED ROLLER SUPPLY METHOD

(75) Inventors: Hiroshi Yamakami, Kanagawa (JP); Kei Misaki, Kanagawa (JP)

(73) Assignee: NSK LTD., Tokyo (JP)

( * ) Notice: Subject to any disclaimer, the term of this patent is extended or adjusted under 35 U.S.C. 154(b) by 344 days.

(21) Appl. No.: 13/825,080

(22) PCT Filed: Jun. 22, 2012

(86) PCT No.: PCT/JP2012/066078
§ 371 (c)(1),
(2), (4) Date: Mar. 19, 2013

(87) PCT Pub. No.: WO2013/073224
PCT Pub. Date: May 23, 2013

(65) Prior Publication Data
US 2013/0175287 A1    Jul. 11, 2013

(30) Foreign Application Priority Data

Nov. 18, 2011 (JP) .................................. 2011-253020

(51) Int. Cl.
*B65G 59/06* (2006.01)
*B23P 15/00* (2006.01)
(Continued)

(52) U.S. Cl.
CPC ............. *B65G 59/061* (2013.01); *B23P 19/002* (2013.01); *B23P 19/003* (2013.01); *B65G 59/066* (2013.01); *F16C 43/065* (2013.01); *B23P 15/003* (2013.01); *F16C 19/364* (2013.01); *Y10T 29/49682* (2015.01); *Y10T 29/49686* (2015.01); *Y10T 29/53261* (2015.01)

(58) Field of Classification Search
CPC .. B65G 59/061; B65G 59/066; B23P 19/003; B23P 19/002; B23P 15/003; F16C 43/065; Y10T 29/49636; Y10T 29/49682; Y10T 29/49686; Y10T 29/497; Y10T 29/53; Y10T 29/534; Y10T 29/53261
See application file for complete search history.

(56) References Cited

U.S. PATENT DOCUMENTS 7,654,384 B1    2/2010  Keil
7,900,356 B2 *  3/2011  Fuse ........................ 29/898.061

FOREIGN PATENT DOCUMENTS

CN          1637308 A      7/2005
EP       0 623 534 A2     11/1994
(Continued)

OTHER PUBLICATIONS

English Machine Translation of JP 2001-87952 A.*
(Continued)

*Primary Examiner* — Sarang Afzali
(74) *Attorney, Agent, or Firm* — Sughrue Mion, PLLC

(57) ABSTRACT

A tapered roller bearing fabricating system and a tapered roller supply method are provided which enable tapered rollers to be loaded properly in pockets of a cage. The tapered roller supply system has a tube which stocks a plurality of tapered rollers loaded from above in a stacked-up state in an inside thereof and a tapered roller supply portion which separates a lowermost tapered roller from a tapered roller situated above the lowermost tapered roller in the plurality of tapered rollers to be discharged from the tube in upstream and downstream directions so as to allow the tapered rollers to drop sequentially one by one when they reach a lowermost position.

4 Claims, 8 Drawing Sheets

(51) Int. Cl.
  *F16C 43/08* (2006.01)
  *B23P 19/00* (2006.01)
  *F16C 43/06* (2006.01)
  *F16C 19/36* (2006.01)

(56) References Cited

FOREIGN PATENT DOCUMENTS

| JP | 50-37657 Y2 | 11/1975 |
| JP | 634233 U | 1/1988 |
| JP | 5-29790 Y2 | 7/1993 |
| JP | 200187952 A | 4/2001 |
| JP | 200764312 A | 3/2007 |
| JP | 3163131 U | 9/2010 |
| JP | 201136820 A | 2/2011 |

OTHER PUBLICATIONS

English Machine Translation of JP 2011-036820 A.*
Certified priority document JP 2011-253020.*
English Translation of International Search Report dated Jul. 17, 2012 issued by the International Searching Authority in counterpart International Application No. PCT/JP2012/066078.
Communication, Issued by the State Intellectual Property Office of P.R. China, Dated Nov. 3, 2014, in counterpart Chinese Application No. 201280000598.3.
International Search Report dated Jul. 17, 2012 issued by the International Searching Authority in counterpart International Application No. PCT/JP2012/066078.
Written Opinion dated Jul. 17, 2012 issued by the International Searching Authority in counterpart International Application No. PCT/JP2012/066078.

* cited by examiner

TAPERED ROLLER BEARING FABRICATING SYSTEM AND TAPERED ROLLER SUPPLY METHOD

TECHNICAL FIELD

The present invention relates to a tapered roller supply system, a tapered roller bearing fabricating system, and a tapered roller supply method.

BACKGROUND ART

Conventionally, as a tapered roller bearing fabricating method, there is known a fabricating method in which as shown in FIGS. 7 and 8, by using a tapered roller supply system 110 in installing tapered rollers 1 in pocket portions 6 of a cage 2, a plurality of tapered rollers 1 are loaded in a tube 120 which extends in a vertical direction (a gravitational direction: a Z direction in FIG. 7) towards an inner circumference of the case 2 with a smaller diameter end oriented downwards, and a lowermost tapered roller 1 is separated so as to be loaded in a pocket portion 6 of the case 2.

To describe the method in greater detail, the tapered roller supply system 110 includes the tube 120 which stores in an inside hollow hole 120a the plurality of tapered rollers 1 which are loaded from above to be stacked up in the vertical direction in such a way as to be in abutment with each other, a cage resting portion 150 on which the cage 2 into which the tapered rollers 1 supplied from a lower end of the tube 120 are loaded is rested rotatably, and a top plate 158 to which the tube 120 is fixed, which has a cutout through which the tapered rollers 1 pass and which is disposed on a top portion of the cage resting portion 150. Here, the tapered rollers 1 are loaded in an inside of the hollow hole 120a in the tube 120 in such a way that the smaller diameter end is oriented downwards or constitutes a leading end.

The case resting portion 150 has a shaft 152 which extends in the Z direction, a lower table 154 which is fixed above the shaft 152, and a jig 156 that is fixed to an upper surface of the lower table 154 so as to be in abutment therewith and on a lower portion of an outer circumferential surface 156a of which the cage 2 is fixedly fitted. An upper surface of the jig 156 and a lower surface of the top plate 158 face oppositely each other with a gap defined therebetween.

Here, as shown in FIG. 8, the cage 2 has a small-diameter annular portion 3, a large-diameter annular portion 4 and a plurality of pillar portions 5 that connect the small- and large-diameter annular portions 3, 4 and which are disposed circumferentially at predetermined intervals, and the plurality of pocket portions 6 for holding the tapered rollers 1 are formed in the cage 2. Then, the cage 2 is fitted on the outer circumferential surface 156a of the jig 156 at an inner circumferential surface of the small-diameter annular portion 3 with the large-diameter annular portion 4 oriented upwards.

Portions of the outer circumferential surface 156a of the jig 156 are set back from the rest for roller accommodating portions 156b, so that the tapered rollers 1 carried from the lower end of the tube 120 are positioned for accommodation.

The shaft 152 can be rotated by a motor (not shown) connected to a lower end thereof or manually, whereby the lower table 154, the jig 156 and the cage 2 are allowed to rotate altogether in association with the rotation of the shaft 152.

In the tapered roller supply system 110 configured in this way, first of all, the tapered rollers 1 are stacked up in the vertical direction in the hollow hole 120a in the tube 120 so as to be in abutment with each other. Then, the lowermost tapered roller 1 which passes through the tube 120 comes into contact with a lower portion of the jig 156 to stop. Thereafter, the jig 156 and the cage 2 are rotated for assemblage. Additionally, the tube 120 and the top plate 158 are allowed to move in a vertical direction by a driving mechanism, not shown, so that they are withdrawn upwards when a cage 2 or an inner ring (not shown) is carried in.

In addition, as another tapered roller bearing fabricating method, there is known a fabricating method in which a large-diameter annular portion of a cage is oriented upwards, and tapered rollers are inserted into pockets of the cage with large diameter ends thereof acting as leading ends from an inner circumferential side of the cage and a small-diameter annular portion side (a lower side) of the cage (refer to Patent Document 1).

RELATED ART REFERENCE

Patent Reference

Patent Document 1: JP-A-2007-64312

SUMMARY OF THE INVENTION

Problems to be Solved by the Invention

In the tapered roller bearing fabricating method shown in FIG. 7, however, the tapered rollers 1 which are stacked up in the vertical direction are pressed against each other by weight, and a large frictional force is produced on an upper surface and a lower surface of the tapered rollers 1. Then, when the lowermost tapered roller 1 receives a force directed towards the pocket portion 6 of the cage 2 from the jig 156, a couple is produced between the frictional force and the force received, whereby the lowermost tapered roller 1 tends to easily collapse its posture. As this occurs, the tapered roller 1 is not loaded into the pocket portion 6 of the cage 2, resulting in fears that a situation is caused to occur which calls for a stop of the fabrication process.

With a view to preventing the occurrence of the situation described above, it is considered that by adopting the tapered roller bearing fabricating method described in Patent Document 1, the tapered rollers are carried in the opposite direction to gravity, that is from bottom to top, so as to release the leading tapered roller to be loaded in the pocket of the cage from the influence of the gravity of other tapered rollers.

However, the method of loading the tapered rollers into the pockets of the cage with the large diameter ends thereof acting as the leading ends requires a large-scale modification to be made to the conventional facility and the mechanism becomes complex, and therefore, the method is impractical.

The invention has been made in view of the problem inherent in the system shown in FIG. 7, and an object thereof is to provide a tapered roller supply system, a tapered roller bearing fabricating method and a tapered roller supply method which enables a proper loading of tapered rollers into pockets of a cage with a simple configuration.

Means for Solving the Problems

The object of the invention will be attained by the following configurations.

(1) A tapered roller supply system having:

a stock portion for stocking a plurality of tapered rollers loaded from above in a stacked-up state in an inside thereof; and a tapered roller supply portion for separating, in the plurality of tapered rollers to be discharged from the stock portion, a lowermost tapered roller from the other tapered rollers which are positioned above the lowermost tapered roller in upstream and downstream directions so as to allow the tapered rollers to drop sequentially one by one when they reach a lowermost position.

(2) The tapered roller supply system set forth in (1), wherein
the tapered roller supply portion has:
a pair of rotatable cylindrical members each having a spiral groove on a radial side surface thereof; and
a pair of guides which face oppositely the radial side surfaces of the pair of cylindrical members, and wherein
the plurality of tapered rollers are separated one by one in the upstream and downstream directions by the spiral grooves on the radial side surfaces of the pair of cylindrical members and the guides so as to allow the tapered rollers to drop sequentially one by one when they reach a lowermost position.

(3) The tapered roller supply system set forth in (1), wherein
the tapered roller supply portion has a drop stopping function to stop a lowermost tapered roller and a second lowermost tapered roller in the plurality of tapered rollers to be discharged from the stock portion, and wherein
the tapered rollers are allowed to drop sequentially one by one when they reach a lowermost position.

(4) The tapered roller supply system set forth in any of (1) to (3), having a plurality of tapered roller supply portions like the tapered roller supply portion.

(5) A tapered roller bearing fabricating system comprising the tapered roller supply system set forth in any of (1) to (4).

(6) A tapered roller supply method having:
a step of stocking a plurality of tapered rollers loaded from above in a stacked-up state in an inside thereof; and
a step of separating, in the plurality of tapered rollers to be discharged from the stock portion, a lowermost tapered roller from the other tapered rollers which are positioned above the lowermost tapered roller in upstream and downstream directions so as to allow the tapered rollers to drop sequentially one by one when they reach a lowermost position.

Advantage of the Invention

According to the tapered roller supply system of the invention, in the plurality of tapered rollers to be discharged from the stock portion, the lowermost tapered roller is allowed to be separated from the other tapered rollers which are position above the lowermost tapered roller in the upstream and downstream directions so as to allow the tapered rollers to drop sequentially one by one when they reach the lowermost position. Consequently, although the configuration is simple, the lowermost tapered roller is prevented from being subjected to the influence of the weights of the other tapered rollers, whereby the stable separation is enabled, thereby making it possible to load properly the tapered rollers in the pockets of the cage.

MODES FOR CARRYING OUT THE INVENTION

Hereinafter, embodiments of a tapered roller supply system, a tapered roller bearing fabricating system, and a tapered roller supply method according to the invention will be described in detail based on the drawings.

First Embodiment

Figure 1:
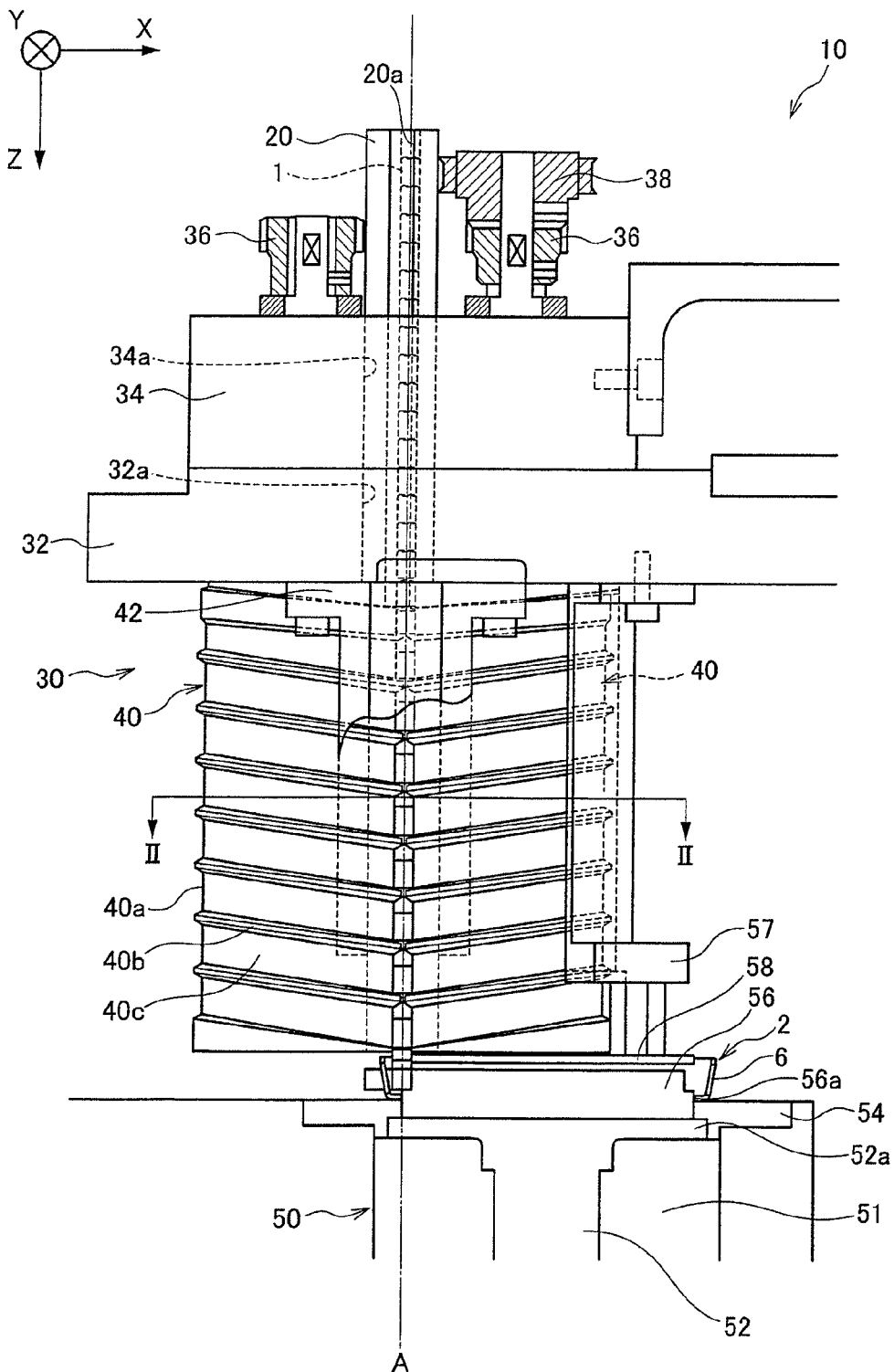
FIG. 1 is a view resulting when a tapered roller supply system according to a first embodiment of the invention is seen from a horizontal direction.

FIG. 1 shows a tapered roller supply system 10 according to a first embodiment of the invention. The tapered roller supply system 10 includes a tube 20 as a stock portion which stocks a plurality of tapered rollers 1 loaded from above in a stacked-up state in an inside of a hollow hole 20a, a tapered roller supply portion 30 which supplies the plurality of tapered rollers 1 which are discharged from the tube 20 downwards, and a cage resting portion 50 on which a cage 2 into which the tapered rollers 1 supplied from the tapered roller supply portion 30 are to be loaded is rested rotatably. Here, the tapered rollers 1 are loaded into the tube 20 so that a small diameter end thereof acts as a leading (downstream) end. Additionally, the diameter of the hollow hole 20a in the tube 20 is set to be slightly larger than a diameter of the tapered roller 1 at a large diameter end.

Figure 2:
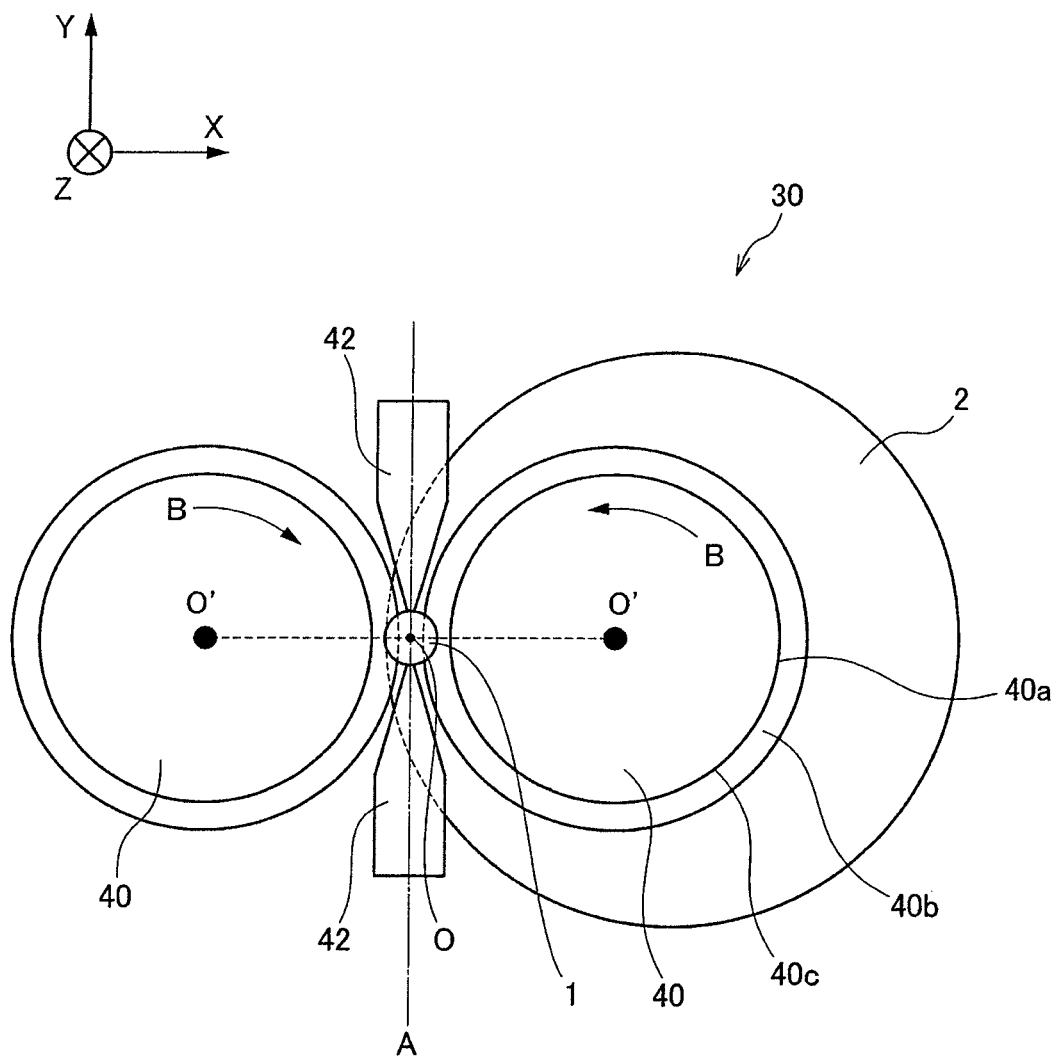
FIG. 2 is a sectional view taken along the line II-II in FIG. 1 and seen in a direction indicated by arrows.

The tapered roller supply portion 30 includes a base 32 which extends in an X direction and a Y direction which are at right angles to a gravitational direction (a Z direction in FIG. 1), a bearing block 34 which is rested on an upper surface of the base 32, a pair of screws (cylindrical members) 40 which are disposed rotatably on both sides of the base 32 in the X direction therebelow and which extend in the Z direction, and a pair of guides 42 (refer to FIG. 2) that are fixed to a central portion of a lower surface in the X direction of the base 32 and which extend in the Z direction (refer to FIG. 2). Additionally, a top plate 58 is fixed to lower portions of the pair of guides 42. Then, the base 32 is allowed to move in vertical directions by a driving mechanism, not shown, whereby the pair of screws 40, the pair of guides 42 and the top plate 58 are also moved in the vertical directions in association with the movement of the base 32.

Through holes 32a, 34a are provided in central portions of the base 32 and the bearing block 34 in the X direction (which are represented as an imaginary plane A in FIG. 1), respectively, and these through holes 32a, 34a extend in the Z direction and communicate with each other. The tube 20 is inserted into these through holes 32a, 34a and is fixed parallel to the Z direction. A length of the tube 20 in the Z direction is set so as to be longer than a total length of the through holes 32a, 34a in the Z direction and extends upwards of the bearing block 34.

Respective rotational shafts of the pair of screws 40 penetrate the base 32 and the bearing block 34 and have gears 36 at upper end portions thereof. A pulley 38 is attached to the rotational shaft of one of the screws 40. The pulley 38 is made to be driven by a servo motor (not shown) via a timing belt. The gears 36 provided on the rotational shafts are connected to each other by a gear, not shown, so as to rotate the pair of screws 40 in opposite directions to each other.

In addition, as shown in FIG. 2, the pair of screws 40 are disposed so as to be spaced slightly apart from each other in the X direction. Additionally, a spiral projection 40b is provided on a radial side surface 40a of each screw 40 so as to project radially therefrom to thereby define a spiral groove 40c. The pair of screws 40, which are formed axisymmetry with respect to the imaginary plane A, are configured so that the tapered rollers 1 are carried along the Z direction by the spiral grooves 40c as the pair of screws 40 rotate in directions indicated by arrows B (refer to FIG. 2).

The pair of guides 42 are disposed so as to face oppositely each other in the Y direction so that the pair of guides 42 face oppositely the radial side surfaces 40a of the pair of screws 40. The pair of guides 42 are tapered so as not to interfere with the projections 40b of the pair of screws 40. The pair of guides 42 hold the tapered rollers 1 with the spiral projections 40b of the pair of screws 40 therebetween so as to prevent the tapered rollers 1 from falling from the spiral projections 40b. Consequently, the pair of guides 42 are disposed symmetrically with respect to an imaginary line (represented by a broken line in FIG. 2) which connects centers O' of the pair of screws 40 and guide outer circumferential surfaces of the tapered rollers 1 so that a center O of the tapered roller 1 is positioned on a substantially middle point of the imaginary line which connects the centers O' of the pair of screws 40.

Figure 3:
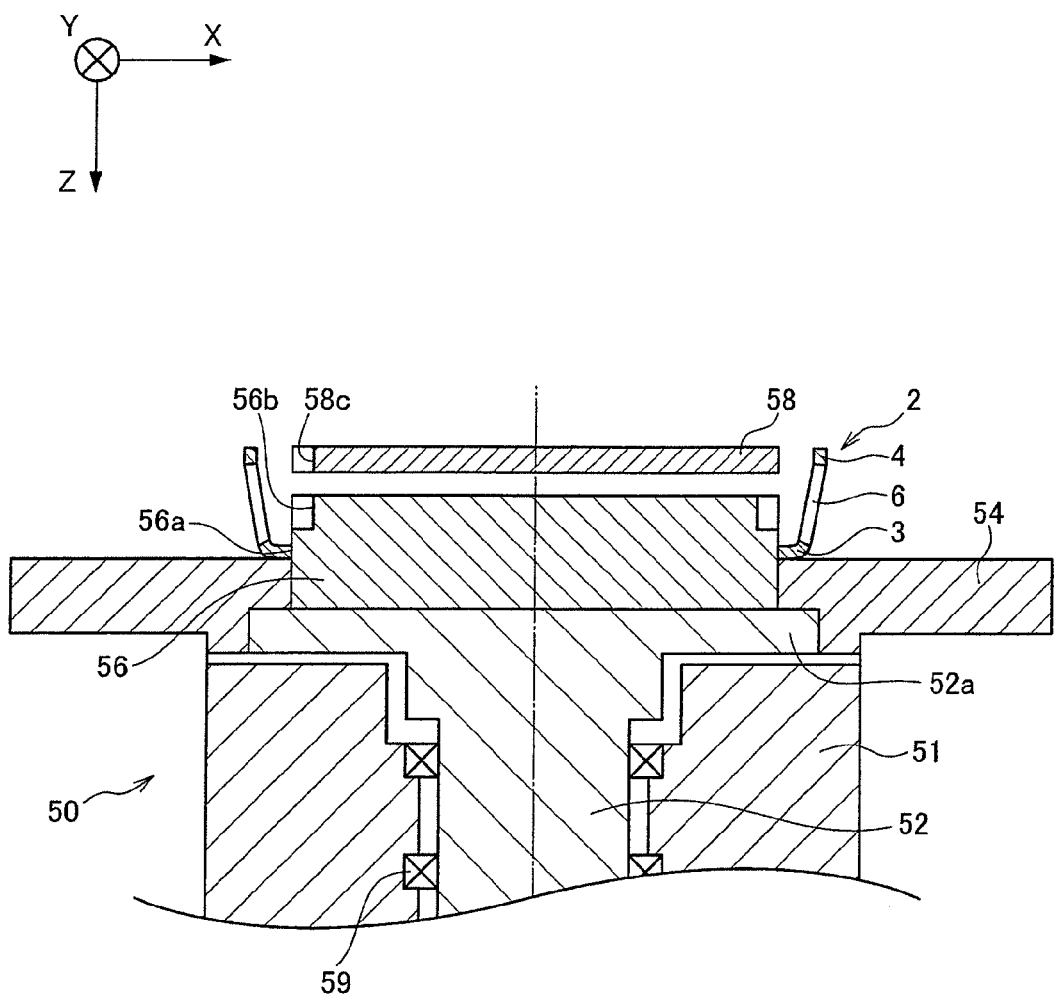
FIG. 3 is an enlarged sectional view of the periphery of a cage resting portion in FIG. 1.

Referring to FIG. 3, too, the cage resting portion 50 has a base 51 which extends in the Z direction, a shaft 52 that is supported rotatably on an inner circumferential surface of the base 51 via a plurality of bearings 59, which extends in the Z direction and which has a flange portion 52a at an upper portion thereof, a lower table 54 that is fixed to an outer circumferential surface of the flange portion 52a and which extends upwards of the flange portion 52a, and a jig 56 that is fixed so as to be brought into abutment with an upper surface of the flange portion 52a and an inner circumferential surface of the lower table 54 and on an outer circumferential surface 56a of which the cage 2 is allowed to be fixedly fitted. An upper surface of the jig 56 and a lower surface of the top plate 58 are set so as to face oppositely each other via a gap even when the base 32 is displaced to a lowermost end thereof, that is, even when the top plate 58 is displaced to a lowermost end thereof.

Figure 8:
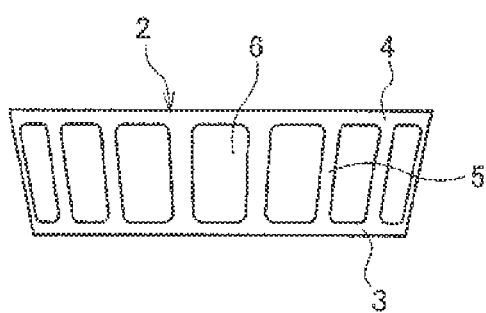
FIG. 8 is a plan view showing a cage.

Here, the cage 2 of this embodiment has the same configuration as that of the cage 2 of the related art shown in FIG. 8, and an inner circumferential surface of a small diameter annular portion 3 is fitted on the outer circumferential surface 56a of the jig 56 so that a large diameter annular portion 4 is disposed upwards.

The jig 56 has a substantially cylindrical shape, and roller accommodating portions 56b are set back from a surface of an upper portion of the circumferential surface 56a of the jig 56, whereby the tapered rollers 1 which are supplied from the tapered roller supply portion 30 can be accommodated in the roller accommodating portions 56b.

Figure 4:
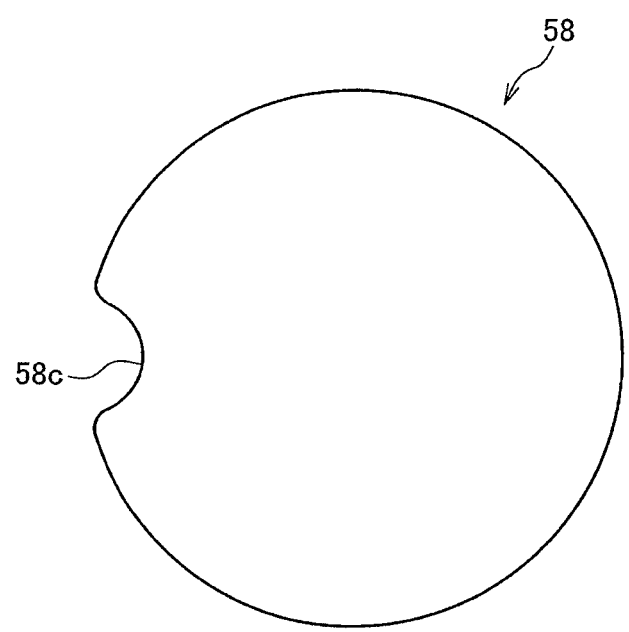
FIG. 4 is a plan view of a top plate as seen from a vertical direction.

The top plate 58 has a substantially disk shape and is fixed to a bracket 57 which is bolted to the pair of guides 42 and a lower surface of the base 32. Additionally, an outside diameter of the top plate 58 is made to be substantially the same as an outside diameter of the jig 56, and a cutout 58c having a semicircular cross section is formed in an outer circumferential surface of the top plate 58 (refer to FIG. 4). The cutout 58c is provided so that the tapered rollers 1 supplied from the tapered roller supply portion 30 lying thereabove are allowed to drop into the roller accommodating portions 56b of the jig 56.

The shaft 52 is allowed to rotate around an Z axis by a servo motor (not shown) which is connected to a lower end thereof, whereby the lower table 54, the jig 56 and the cage 2 also rotate altogether in association with the rotation of the shaft 52. On the other hand, as previously described, since the top plate 58 is fixed to the pair of guides 42 and the bracket 57, the top plate 58 does not rotate even when the shaft 52 rotates.

Here, a tapered roller assembling method according to the invention will be described.

First of all, the tapered rollers 1, which are aligned so that a small diameter end acts as a leading end (or is oriented downwards), are loaded into an inside of the hollow hole 20a in the tube 20. The tapered rollers 1 loaded into the inside of the hollow hole 20a in the tube 20 pass through the through hole 34a in the bearing block 34 and the through hole 32a in the base 32 and move as far as an entrance to the pairs of screws 40 and guides 42.

Following this, the tapered rollers 1 are supported at their lower surface by the respective projections 40b of the pair of screws 40 and are held at their outer circumferential surface by the grooves 40c of the pair of screws 40 and the pair of guides 42, whereby the postures of the tapered rollers 1 are maintained properly.

The plurality of tapered rollers 1 which are discharged continuously from the tube 20 are carried downwards while being separated one by one in upstream and downstream directions by the grooves 40c of the pair of screws 40 and the pair of guides 42 by rotating the pair of screws 40 and are then allowed to free drop from lowermost ends of the screws 40 sequentially one by one at very accurate time intervals.

Here, the cage 2, the shaft 52, the lower table 54 and the jig 56 are synchronized with the rotation of the screws 40 so that they rotate by an angle corresponding to a space between the adjacent pocket portions 6 of the cage 2 when the screws 40 rotate one full rotation. Consequently, the tapered rollers 1 which free drop from the screws 40 are loaded into the individual pocket portions 6 of the cage 1 accurately.

Then, after the tapered rollers 1 are loaded into all the pocket portions 6 of the cage 2, the top plate 58 and the like are withdrawn upwards by moving the base 32 upwards by a moving mechanism, not shown, while the shaft 52, the lower table 54 and the jig 56 of the cage resting portion 50 are lowered. Then, an inner ring (not shown) is assembled into the cage 2 from an inner circumferential side thereof by a known method. Thereafter, the tapered rollers 1, the cage 2 and the inner ring are transferred to the following step as an integral unit (the assemblage completes).

Thus, as has been described heretofore, according to the tapered roller supply system 10 of this embodiment, the plurality of tapered rollers 1 are separated from each other in the upstream and downstream directions by the grooves 40c on the radial side surfaces 40a of the pair of screws 40 and the pair of guides 42, so that the tapered rollers 1 are allowed to drop sequentially one by one when they reach the lowermost position. Consequently, although the configuration is simple, the lowermost tapered roller 1 is prevented from being subjected to the influence of the weights of the other tapered rollers 1, whereby the stable separating operation is enabled, thereby making it possible to load the tapered rollers 1 into the pocket portions 6 of the cage 1 properly.

Second Embodiment

Figure 7:
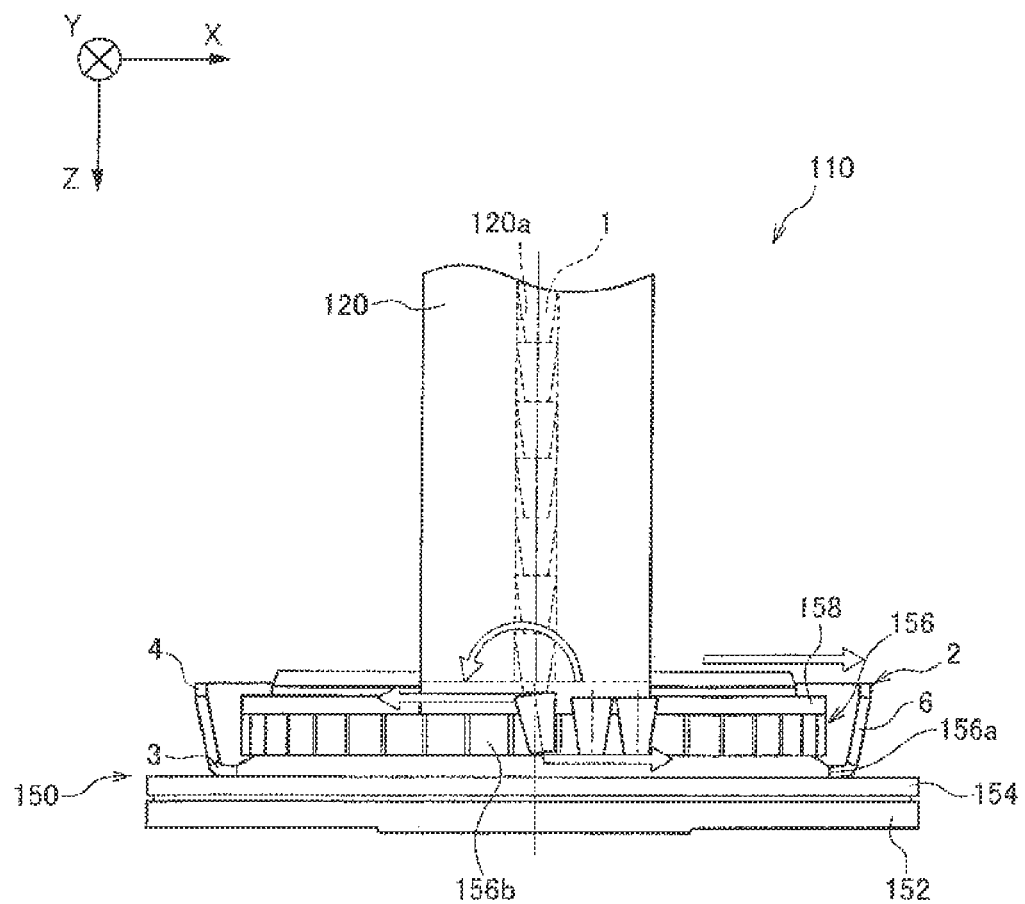
FIG. 7 is a view resulting when a conventional tapered roller supply system is seen from a horizontal direction.

Next, a tapered roller supply system according to a second embodiment of the invention will be described. A tapered roller supply system 110A of the embodiment has substantially the same basic configuration as that of a conventional tapered roller supply system 110 shown in FIG. 7, and therefore, like reference numerals will be given to like or corresponding portions to those of the conventional tapered roller supply system 110.

The tapered roller supply system 110A of this embodiment includes a tube 120 which stocks a plurality of tapered rollers 1 loaded from above in a stacked-up state in which the tapered rollers 1 are stacked up so as to be in abutment with each other in a hollow hole 120a in an inside thereof, a tapered roller supply portion 130 which supplies downwards the plurality of tapered rollers 1 to be discharged from the tube 120, and a cage resting portion 150 on which a cage 2 into which the tapered rollers 1 supplied from the tapered roller supply portion 130 are to be loaded is rested rotatably. Here, the cage resting portion 150 has the same configuration as that of the cage resting portion 150 of the conventional tapered roller supply system shown in FIG. 7.

Figure 5:
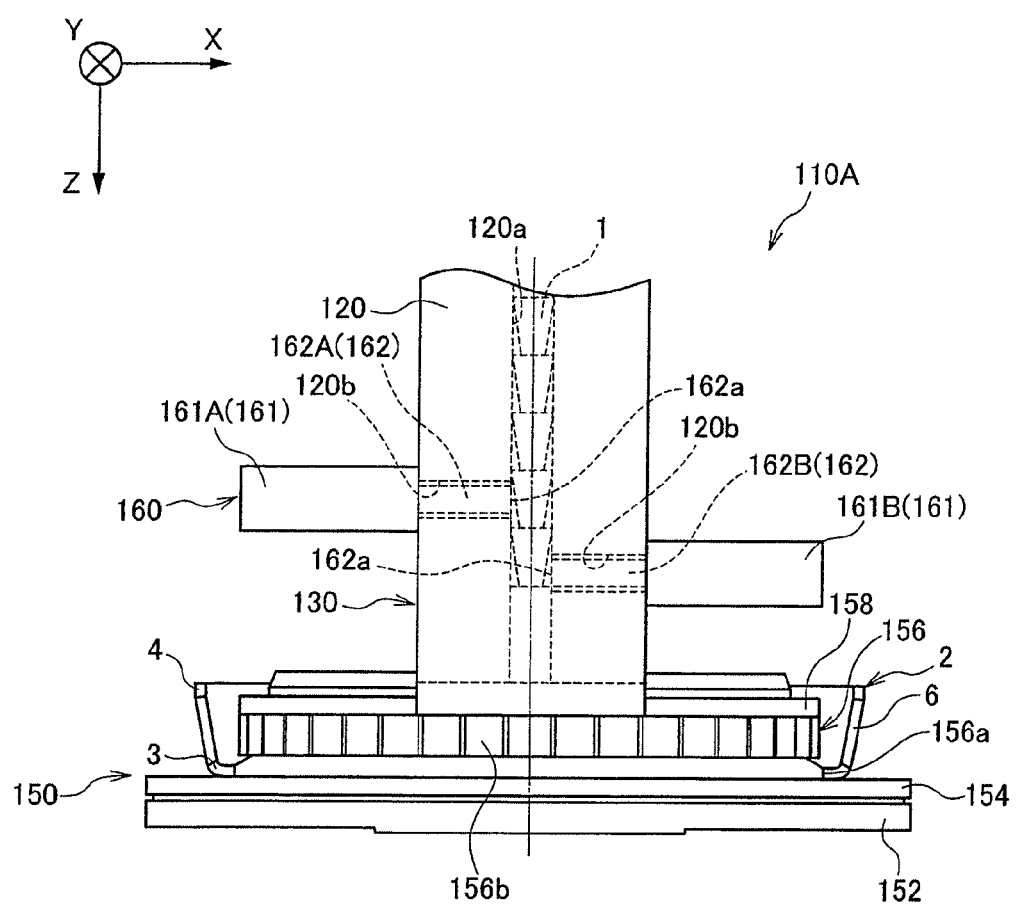
FIG. 5 is a view resulting when a tapered roller supply system according to a second embodiment of the invention is seen from a horizontal direction.

As shown in FIG. 5, a pair of communication holes 120b are provided in the tube 120 of this embodiment in different positions in a Z direction so as to penetrate radially into the tube 120 from an outer circumferential surface thereof to communicate with the hollow hole 120a.

Additionally, the tapered roller supply portion 130 includes a drop stopping mechanism 160 which stops the drop of a lowermost tapered roller 1 and a second lowermost tapered roller 1 in the plurality of tapered rollers 1 to be discharged from the tube 120. The drop stopping mechanism 160 includes a pair of cylinders which are disposed in the different positions in the Z direction, that is, upper and lower cylinders 161A, 161B and expandable upper and lower rods 162A, 162B which extend radially inwards from the upper and lower cylinders 161A, 161B through insides of the communication holes 120b in the tube 120 (hereinafter, also, referred to simply as cylinders 161 and rods 162 from time to time).

Here, a tapered roller assembling method according to the invention will be described.

First of all, the tapered rollers 1, which are aligned so that a small diameter end acts as a leading end (or is oriented downwards), are loaded into an inside of the hollow hole 120a in the tube 120. The tapered rollers 1 loaded into the inside of the hollow hole 120a in the tube 120 free drop by gravity. As this occurs, the lower cylinder 161B is driven in advance so that the lower rod 162B extends so as to stop the drop of the tapered roller 1. Consequently, when the leading or lowermost tapered roller 1 drops to a position which faces oppositely the lower rod 162B, a distal end face 162a of the lower rod 162B comes into abutment with an outer circumferential surface of the lowermost tapered roller 1, whereby the drop of the lowermost tapered roller 1 is stopped. As this occurs, the second lowermost tapered roller 1 and the other tapered rollers 1 following it are being stacked up on the lowermost tapered roller 1.

Next, the upper cylinder 161A is driven to extend the upper rod 162A, whereby a distal end face 162a of the upper rod 162A is brought into abutment with an outer circumferential surface of the second lowermost tapered roller 1 so as to restrain the second lowermost tapered roller 1. In this way, by stopping the drop of the lowermost and second lowermost tapered rollers 1, the plurality of tapered rollers 1 which are situated upwards of the second lowermost tapered roller 1 are also stopped dropping.

Thereafter, only the lowermost tapered roller 1 is allowed to drop by releasing the restraint of the lowermost tapered roller 1 by the lower rod 162B, so that the tapered roller 1 is accommodated in a roller accommodating portion 156b of a jig 156 to be loaded into a pocket portion 6 of the cage 2.

Thereafter, the jig 156 and the cage 2 are rotated by an angle corresponding to a space between the adjacent pocket portions 6 so that the tapered roller 1 which is supplied next from the tapered roller supply portion 130 is loaded into the pocket portion 6 in a smooth fashion.

Following this, after the lower rod 162B is extended, the restraint of the second lowermost tapered roller 1 by the upper rod 162A is released, and the tapered roller 1 which drops free is then restrained from dropping by the lower rod 162B. Thereafter, the method is repeated so that the tapered rollers 1 are allowed to drop sequentially one by one when they reach a lowermost position so as to be loaded into the pocket portions 6 of the cage 2.

Then, after the tapered rollers 1 are loaded in all the pocket portions 6 of the cage 2, the tube 120 and a top plate 158 are withdrawn upwards by a moving mechanism, not shown, while a shaft 152, a lower table 154 and the jig 156 of the cage resting portion 50 are lowered, and an inner ring (not shown) is assembled into the cage 2 from an inner circumferential side thereof by a known method, whereby the tapered rollers 1, the cage 2 and the inner ring are integrated into one unit for transfer to the following step.

Thus, as has been described heretofore, according to the tapered roller supply system 110A of this embodiment, the drop stopping mechanism 160 is provided which stops the drop of the lowermost and second lowermost tapered rollers 1 in the plurality of tapered rollers 1 to be discharged from the tube 120, so that the tapered rollers 1 are allowed to drop sequentially one by one when they reach the lowermost position. Consequently, although with the simple configuration, the lowermost tapered roller 1 is prevented from being subjected to the influence of the weights of the other tapered rollers 1, whereby the stable separation is enabled, thereby making it possible to properly load the tapered rollers 1 in the pocket portions 6 of the cage 1.

In the embodiment, while the distal end face 162a of the rod 162 is brought into abutment with the outer circumferential surface of the lowermost tapered roller 1 so as to stop the drop of the tapered roller 1, a configuration may also be adopted in which the rod 162 is caused to extend so as to support a lower surface of the tapered roller 1 to thereby stop the drop of the tapered roller 1.

It should be noted that the invention is not limited to the embodiments and hence can be modified or improved as required.

For example, the carrying path of the tapered rollers 1 defined by the tube 20 and the screws 40 in the first embodiment and the carrying path of the tapered rollers 1 defined by the tube 120 in the second embodiment are arranged so as to be parallel to the gravitational direction (the Z direction). However, the invention is not limited thereto, and hence, the carrying path of the tapered rollers 1 may be arranged so as to be inclined relative to the gravitational direction.

In addition, the plurality of tapered rollers 1 may be loaded in the hollow hole 120a in the tube 20 with the large diameter end oriented downwards or acting as the leading end.

Figure 6:
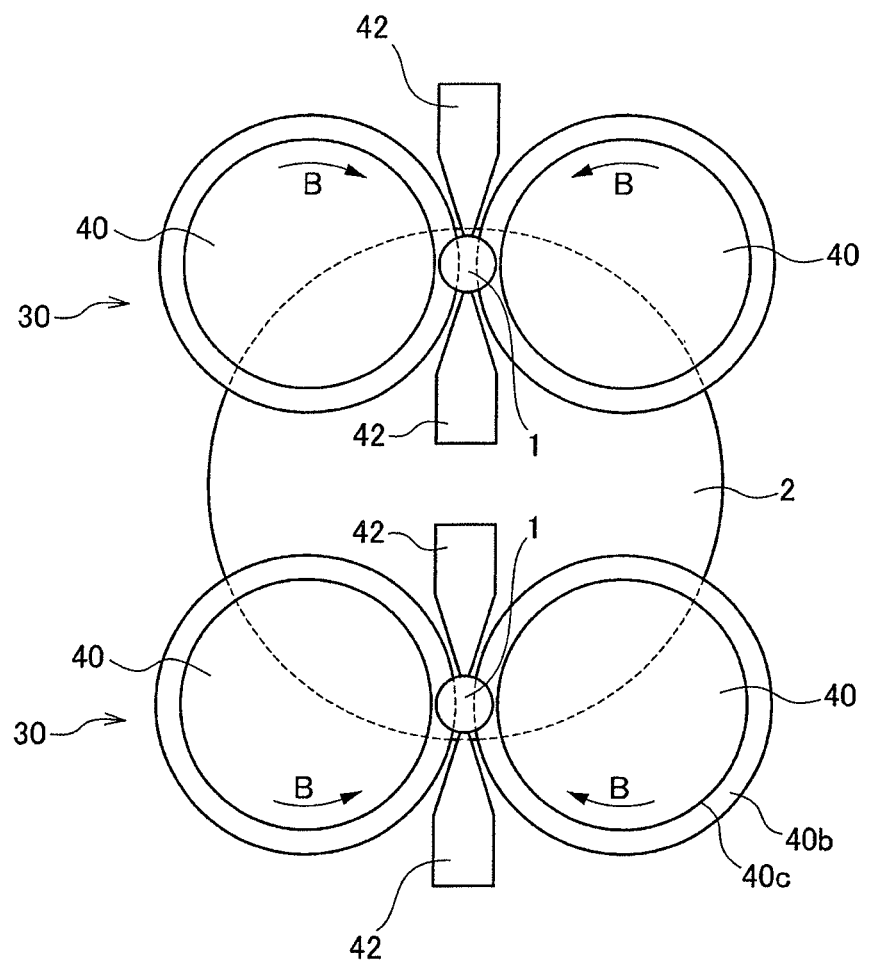
FIG. 6 is an exemplary diagram of a tapered roller supply system according to a modified example of the invention in which two tapered roller supply portions are provided.

Additionally, in the first and second embodiments, a plurality of tapered roller supply portions 30, 130 may be provided. In this case, a plurality of lowermost tapered rollers 1 drop simultaneously from the plurality of tapered roller supply portions 30, 130 so as to be loaded into a plurality of pocket portions 6 simultaneously. FIG. 6 shows a situation in which two tapered roller supply portions 30 are provided in the first embodiment. By adopting this configuration, the loading of the tapered rollers 1 into the pocket portions 6 of the cage 2 can be executed at high speeds.

This patent application is based on Japanese Patent Application No. 2011-253020 filed on Nov. 18, 2011, the contents of which are incorporated herein by reference.

DESCRIPTION OF REFERENCE NUMERALS AND SIGNS

1 tapered roller;
10, 110 A tapered roller supply system;
20, 120 tube (stock portion);
30, 130 tapered roller supply portion (tapered roller supply portion);
40 screw (cylindrical member);
40*a* radial side surface;
42 guide;
160 drop stopping mechanism.

The invention claimed is:

1. A tapered roller bearing fabricating system comprising:
a stock portion configured to stock a plurality of tapered rollers loaded from above in a stacked-up state in an inside of the stock portion;
a tapered roller supply portion configured to separate a lowermost tapered roller from the other tapered rollers, which are positioned above the lowermost tapered roller in upstream and downstream directions, in the plurality of tapered rollers to be discharged from the stock portion so as to allow the tapered rollers to drop sequentially one by one when they reach a lowermost position, wherein the tapered roller supply portion includes:
a pair of rotatable cylindrical members each having a spiral groove on a radial side surface thereof; and
a pair of guides which face oppositely the radial side surfaces of the pair of cylindrical members;
the plurality of tapered rollers are separated one by one in the upstream and downstream directions by the spiral grooves on the radial side surfaces of the pair of cylindrical members and the guides so as to allow the tapered rollers to drop sequentially one by one when they reach a lowermost position; and
a cage;
a rotation mechanism configured to rotate the cage disposed on the rotation mechanism; and
wherein one revolution of one of the rotatable cylindrical members is synchronized with one pitch of the cage.

2. The tapered roller bearing fabricating system of claim 1, wherein the tapered roller supply portion comprises a plurality of tapered roller supply portions.

3. The tapered roller bearing fabricating system of claim 1, wherein the cage includes a plurality of pockets disposed around a periphery thereof for holding the tapered rollers, the pockets being separated by an angle corresponding to the one pitch of the cage.

4. A method of fabricating a tapered roller bearing, comprising:
stocking a plurality of tapered rollers loaded from above in a stacked-up state in an inside of a stock portion; and
separating a lowermost tapered roller from the other tapered rollers using a tapered roller supply portion, which are positioned above the lowermost tapered roller in upstream and downstream directions, in the plurality of tapered rollers to be discharged from the stock portion so as to allow the tapered rollers to drop sequentially one by one when they reach a lowermost position, wherein:
the tapered roller supply portion includes:
a pair of rotatable cylindrical members each having a spiral groove on a radial side surface thereof; and
a pair of guides which face oppositely the radial side surfaces of the pair of cylindrical members;
the separating step is performed using the spiral grooves on the radial side surfaces of the pair of cylindrical members and the guides by rotating a cage disposed on a rotation mechanism by synchronizing one revolution of one of the rotatable cylindrical members with one pitch of the cage.

* * * * *